US012061970B1

United States Patent
Lo et al.

(10) Patent No.: US 12,061,970 B1
(45) Date of Patent: Aug. 13, 2024

(54) SYSTEMS AND METHODS OF LARGE LANGUAGE MODEL DRIVEN ORCHESTRATION OF TASK-SPECIFIC MACHINE LEARNING SOFTWARE AGENTS

(71) Applicant: Broadridge Financial Solutions, Inc., Newark, NJ (US)

(72) Inventors: Joseph Lo, Newark, NJ (US); Fitim Kryeziu, Newark, NJ (US); James Kwiatkowski, Newark, NJ (US)

(73) Assignee: Broadridge Financial Solutions, Inc., Newark, NJ (US)

( * ) Notice: Subject to any disclaimer, the term of this patent is extended or adjusted under 35 U.S.C. 154(b) by 0 days.

(21) Appl. No.: 18/482,731

(22) Filed: Oct. 6, 2023

(51) Int. Cl.
 *G06N 3/0455* (2023.01)
 *G06N 3/094* (2023.01)
 *G06N 3/10* (2006.01)

(52) U.S. Cl.
 CPC .......... *G06N 3/0455* (2023.01); *G06N 3/094* (2023.01); *G06N 3/10* (2013.01)

(58) Field of Classification Search
 CPC ......... G06N 3/0455; G06N 3/094; G06N 3/10
 See application file for complete search history.

(56) References Cited

U.S. PATENT DOCUMENTS

| 2022/0067604 | A1* | 3/2022 | Mahapatra | H04L 67/10 |
| 2023/0114826 | A1* | 4/2023 | Donovan | G06F 9/451 |
| | | | | 706/11 |
| 2023/0360388 | A1* | 11/2023 | Singh | G06F 11/3438 |

OTHER PUBLICATIONS

Tarkoma, Sasu, Roberto Morabito, and Jaakko Sauvola. "AI-native Interconnect Framework for Integration of Large Language Model Technologies in 6G Systems." arXiv preprint arXiv:2311.05842 (2023). (Year: 2023).*

* cited by examiner

*Primary Examiner* — Eric Nilsson
(74) *Attorney, Agent, or Firm* — GREENBERG TRAURIG, LLP

(57) ABSTRACT

Systems and methods of the present disclosure may receive, from a user computing device, a user-provided data record query including a natural language request for information associated with one or more data sources. User persona attributes of the user may be determined, such as a user role or security parameters or both. Based on the user persona attributes a context query may be generated to obtain context attributes associated with the user-provided query. The natural language request and the context attributes are input into the model orchestration large language model (LLM) to output instructions to machine learning (ML) agents based on the context attributes. The ML agents output responses associated with the user-provided data record query based on the instructions, and the responses are input into the model orchestration LLM to output to the user computing device a natural language response based on the context attributes.

20 Claims, 7 Drawing Sheets

SYSTEMS AND METHODS OF LARGE LANGUAGE MODEL DRIVEN ORCHESTRATION OF TASK-SPECIFIC MACHINE LEARNING SOFTWARE AGENTS

FIELD OF TECHNOLOGY

The present disclosure generally relates to systems and methods of large language model (LLM) driven orchestration of task-specific machine learning agents, including user interfacing via the LLM to initiate and coordinate task-specific machine learning agents in response to a user-provided query for data.

BACKGROUND OF TECHNOLOGY

Electronic information search typically employs one or more machine learning and/or heuristic search algorithms. These algorithms are often discrete and task-specific, requiring complex resources to coordinate the algorithms and reconcile the results. Moreover, some domains require compliance with guidelines, rules, regulations and/or other standards for accuracy and conformance.

SUMMARY OF DESCRIBED SUBJECT MATTER

In some aspects, the techniques described herein relate to a method including: receiving, by at least one processor from at least one user computing device associated with a user, a user-provided data record query including a natural language request to perform at least one action with at least one data record; determining, by the at least one processor, a user profile associated with the user; wherein the user profile includes user persona attributes; wherein the user persona attributes include at least one of: a user role, or at least one security parameter associated with the user; generating, by the at least one processor, based on the user persona attributes of the user profile, at least one context query to at least one data source so as to obtain at least one context attribute associated with the data record query; inputting, by the at least one processor, the at least one context attribute into a model orchestration large language model to inject context into a model orchestration large language model runtime of the model orchestration large language model; inputting, by the at least one processor, the natural language request of the data record query as a data record query prompt into the model orchestration large language model to output at least one instruction to at least one data record processing machine learning agent of a plurality of data record processing machine learning agents based at least in part on trained parameters of the model orchestration large language model and the at least one context attribute; inputting, by the at least one processor, the at least one instruction into the at least one data record processing machine learning agent to output at least one response; inputting, by the at least one processor, the at least one response as a response prompt into the model orchestration large language model to output to the user computing device at least one natural language response representative of the at least one action based at least in part on trained parameters of the model orchestration large language model and the at least one context attribute; and causing to display, by the at least one processor, the at least one natural language response in a graphical user interface (GUI) rendered on the user computing device.

In some aspects, the techniques described herein relate to a method, wherein the plurality of data record processing machine learning agents are configured to be instantiated in parallel.

In some aspects, the techniques described herein relate to a method, wherein the at least one data record processing machine learning agent is configured to utilize at least one modular shared data processing component to output the at least one response.

In some aspects, the techniques described herein relate to a method, wherein the at least one data record processing machine learning agent is at least two data record processing machine learning agents; wherein at least one first data record processing machine learning agent is adversarial to at least one second data record processing machine learning agent.

In some aspects, the techniques described herein relate to a method, wherein the at least one first data record processing machine learning agent is configured to output the at least one response; and wherein the at least one second data record processing machine learning agent is configured to: ingest the at least one response from the at least one first data record processing machine learning agent; determine a correctness assessment based at least in part on correctness assessment machine learning parameters; and refine the at least one response based at least in part on the correctness assessment.

In some aspects, the techniques described herein relate to a method, further including: inputting, by the at least one processor, at least one compliance rule into at least one compliance verification machine learning agent to output at least one compliance verification prompt based at least in part on a plurality of compliance verification parameters; wherein the at least one compliance verification prompt is configured to cause the model orchestration large language model to verify compliance of the at least one natural language response with the at least one compliance rule; and inputting, by the at least one processor, the at least one compliance verification prompt into the model orchestration large language model to output at least one compliance verification of the at least one natural language model based at least in part on the trained parameters of the model orchestration large language model and the at least one context attribute.

In some aspects, the techniques described herein relate to a method, further including: inputting, by the at least one processor, based on the at least one compliance verification being representative of the at least one natural language response being non-compliant, the natural language response into at least one compliance machine learning agent to output a variation to the natural language response; inputting, by the at least one processor, the at least one compliance verification prompt and the variation to the natural language response into the model orchestration large language model to output at least one new compliance verification of the variation to the at least one natural language model based at least in part on the trained parameters of the model orchestration large language model and the at least one context attribute.

In some aspects, the techniques described herein relate to a method, wherein the at least one compliance verification includes at least one of: a pass indicative of the at least one natural language response being compliant, or a fail indicative of the at least one natural language response being non-compliant.

In some aspects, the techniques described herein relate to a method, wherein the at least one instruction includes at least one programmatic step including at least one of: at least one database query, at least one application programming interface (API) call, or at least one internet search query.

In some aspects, the techniques described herein relate to a method, further including: tracking, by the at least one processor, the at least one instruction; generating, by the at least one processor, at least one model explainability prompt representative of the at least one instruction; wherein the at least one model explainability prompt is configured to cause the model orchestration large language model to output a natural language explanation of at least one of: the at least one data record processing machine learning agent, or the at least one programmatic step; and inputting, by the at least one processor, the at least one model explainability prompt into the model orchestration large language model to output the natural language explanation based at least in part on the trained parameters of the model orchestration large language model and the at least one context attribute.

In some aspects, the techniques described herein relate to a system including: at least one processor in communication with at least one non-transitory computer readable medium having software instructions stored thereon, wherein the at least one processor, upon execution of the software instructions, is configured to: receive, from at least one user computing device associated with a user, a user-provided data record query including a natural language request to perform at least one action with at least one data record; determine a user profile associated with the user; wherein the user profile includes user persona attributes; wherein the user persona attributes include at least one of: a user role, or at least one security parameter associated with the user; generate based on the user persona attributes of the user profile, at least one context query to at least one data source so as to obtain at least one context attribute associated with the data record query; input the at least one context attribute into a model orchestration large language model to inject context into a model orchestration large language model runtime of the model orchestration large language model; input the natural language request of the data record query as a data record query prompt into the model orchestration large language model to output at least one instruction to at least one data record processing machine learning agent of a plurality of data record processing machine learning agents based at least in part on trained parameters of the model orchestration large language model and the at least one context attribute; input the at least one instruction into the at least one data record processing machine learning agent to output at least one response; input the at least one response as a response prompt into the model orchestration large language model to output to the user computing device at least one natural language response representative of the at least one action based at least in part on trained parameters of the model orchestration large language model and the at least one context attribute; and cause to display the at least one natural language response in a graphical user interface (GUI) rendered on the user computing device.

In some aspects, the techniques described herein relate to a system, wherein the plurality of data record processing machine learning agents are configured to be instantiated in parallel.

In some aspects, the techniques described herein relate to a system, wherein the at least one data record processing machine learning agent is configured to utilize at least one modular shared data processing component to output the at least one response.

In some aspects, the techniques described herein relate to a system, wherein the at least one data record processing machine learning agent is at least two data record processing machine learning agents; wherein at least one first data record processing machine learning agent is adversarial to at least one second data record processing machine learning agent.

In some aspects, the techniques described herein relate to a system, wherein the at least one first data record processing machine learning agent is configured to output the at least one response; and wherein the at least one second data record processing machine learning agent is configured to: ingest the at least one response from the at least one first data record processing machine learning agent; determine a correctness assessment based at least in part on correctness assessment machine learning parameters; and refine the at least one response based at least in part on the correctness assessment.

In some aspects, the techniques described herein relate to a system, wherein the at least one processor is further configured to: input at least one compliance rule into at least one compliance verification machine learning agent to output at least one compliance verification prompt based at least in part on a plurality of compliance verification parameters; wherein the at least one compliance verification prompt is configured to cause the model orchestration large language model to verify compliance of the at least one natural language response with the at least one compliance rule; and input the at least one compliance verification prompt into the model orchestration large language model to output at least one compliance verification of the at least one natural language model based at least in part on the trained parameters of the model orchestration large language model and the at least one context attribute.

In some aspects, the techniques described herein relate to a system, wherein the at least one processor is further configured to: input based on the at least one compliance verification being representative of the at least one natural language response being non-compliant, the natural language response into at least one compliance machine learning agent to output a variation to the natural language response; input the at least one compliance verification prompt and the variation to the natural language response into the model orchestration large language model to output at least one new compliance verification of the variation to the at least one natural language model based at least in part on the trained parameters of the model orchestration large language model and the at least one context attribute.

In some aspects, the techniques described herein relate to a system, wherein the at least one compliance verification includes at least one of: a pass indicative of the at least one natural language response being compliant, or a fail indicative of the at least one natural language response being non-compliant.

In some aspects, the techniques described herein relate to a system, wherein the at least one instruction includes at least one programmatic step including at least one of: at least one database query, at least one application programming interface (API) call, or at least one internet search query.

In some aspects, the techniques described herein relate to a system, wherein the at least one processor is further configured to: track the at least one instruction; generate at least one model explainability prompt representative of the at least one instruction; wherein the at least one model explainability prompt is configured to cause the model orchestration large language model to output a natural language explanation of at least one of: the at least one data record processing machine learning agent, or the at least one programmatic step; and input the at least one model explainability prompt into the model orchestration large language model to output the natural language explanation based at least in part on the trained parameters of the model orchestration large language model and the at least one context attribute.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
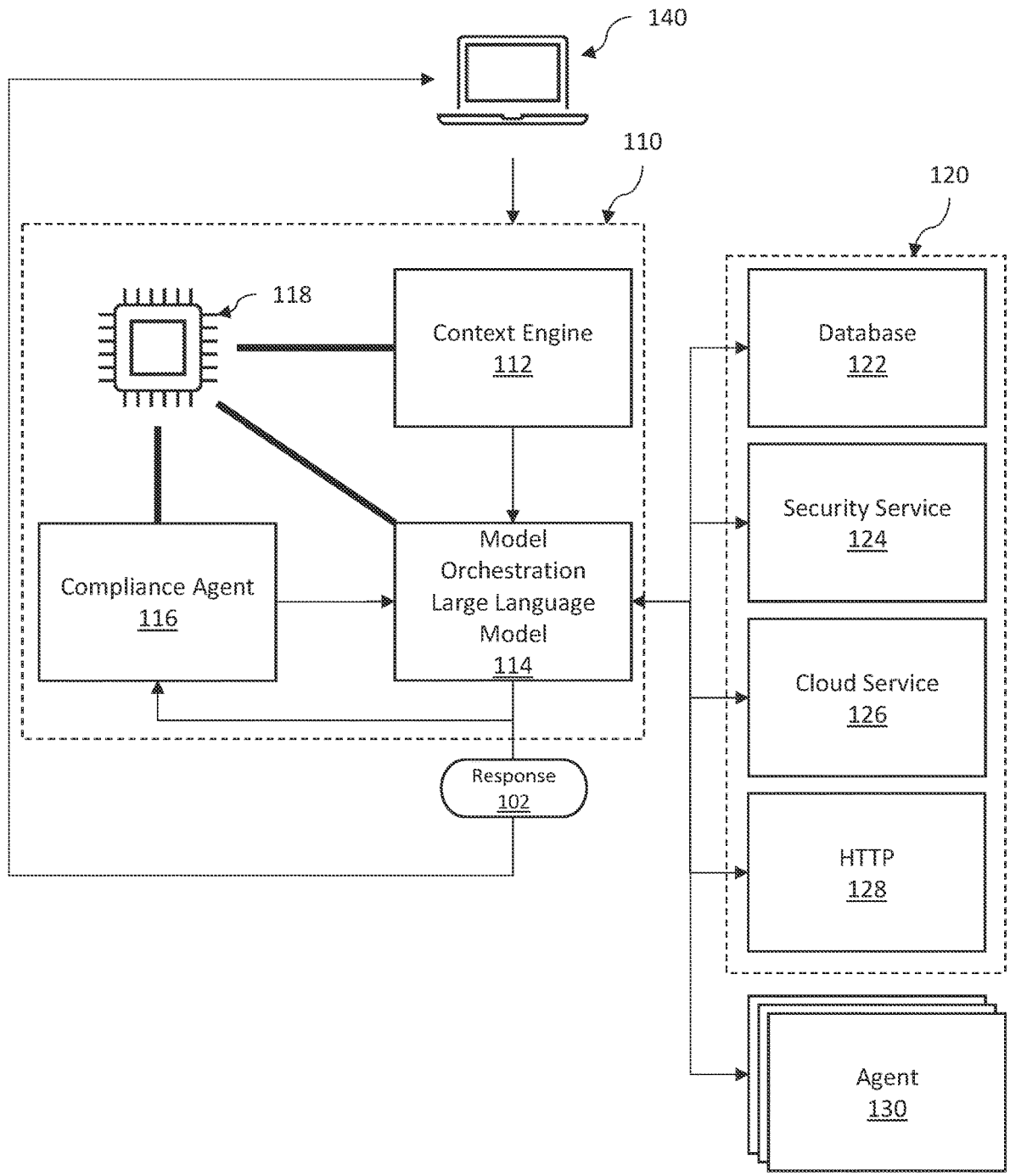
FIG. 1 depicts a system for large language model (LLM) orchestrated data search across public and private data sources in accordance with one or more embodiments of the present disclosure.

FIGS. 1 through 7 illustrate systems and methods of large language model (LLM) driven data querying for response to a user-provided natural language query. The following embodiments provide technical solutions and technical improvements that overcome technical problems, drawbacks and/or deficiencies in the technical fields involving data search scalability when searching across multiple private and/or public data sources, data source integration where each data source typical requires a customized and particular set of tools for interaction, LLM answers that often result in false information delivered as if it were true (commonly referred to as "hallucination") and/or in violation of rules, standards and/or guidelines. As explained in more detail, below, technical solutions and technical improvements herein include aspects of improved integration of machine learning (ML)-based software agents with one or more LLMs such that the LLM(s) provide orchestration of the ML-based software agents enabling improved scalability of data sources, search and analytics, while the ML-based software agents provide parallel checks and verifications of each other and the LLM to reduce hallucination and non-compliant information. Based on such technical features, further technical benefits become available to users and operators of these systems and methods. Moreover, various practical applications of the disclosed technology are also described, which provide further practical benefits to users and operators that are also new and useful improvements in the art.

In at least some embodiments, the terms "agent" and "software agent" are used interchangeably and refer to a program that may perform at least one task at a particular schedule and/or triggering event with at least some degree of autonomy on behalf of its host and flexibility.

In embodiments, the systems and methods of present disclosure may use an LLM in conjunction with a range of publicly available data, privately available data, and task-specific models to answer user queries questions and assist users in identifying information, trends, themes, insights and/or analytics among other information or any combination thereof. In some embodiments, the described systems and methods may be adapted to one or more different domains.

One such example is financial instrument trading. In embodiments of such an example, the systems and methods may use an LLM in conjunction with a range of publicly available data, privately available data, and task-specific models to answer bond-related questions and assist users in identifying bonds, themes, and trends. In embodiments of such an example, the systems and methods may inform and expedite vital pricing decisions, facilitates counterparty selection, broadens liquidity access, enhances the often-complex bond selection and portfolio construction processes, and/or provide other improvements to the financial instrument trading domain.

In some embodiments, this architecture leverages the ability of the LLM to interpret and understand a user-provided question and identify the types of information to be queried. This ability can be leveraged to use the LLM to generate instructions to one or more different task-specific models based on the user-provided question in order to orchestrate the task-specific models that are associated with the information being sought, and in turn resulting in a scalable platform of task-specific models whose results can be translated by the LLM into a natural language response to the user for improved data search, data source integration, data analytics and user interfacing. As a result, the systems and methods of the present disclosure enable more complicated user questions that are answered in reduced time and with greater insight, thus providing improved data timeliness and accuracy, and reduced infrastructure costs.

Various detailed embodiments of the present disclosure, taken in conjunction with the accompanying FIGs., are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

Referring now to FIG. 1, a system for large language model (LLM) orchestrated data search across public and private data sources is depicted in accordance with one or more embodiments of the present disclosure.

In some embodiments, a user may interact with an LLM orchestrated data search platform 110 via a graphical user interface (GUI) of a user computing device 140. In some embodiments, the LLM orchestrated data search platform 110 may leverage a model orchestration LLM 114 to orchestrate data retrieval and data processing of one or more data sources 120 and/or data record processing machine learning (ML) agents 130. In some embodiments, the user may query the LLM orchestrated data search platform 110 for information associated with one or more domains, such as financial instruments, medical information, patient data, scientific information, personal data, business data, among other information and/or data associated with one or more domains or any combination thereof. In some embodiments, to improve accuracy of the data as well as presentation in the GUI, a context engine 112 may inject context data into the model orchestration LLM 114 based on the identify of the user, the user's query, among other factors or any combination thereof. The model orchestration LLM 114 may then task the data sources 120 and/or agent(s) 130 to search, generate, transform or otherwise act on the query to obtain a response 102 to the user's query. A compliance agent 116 may verify the response 102 for compliance to one or more rules defining one or more standards, regulations, guidelines or other rules or any combination thereof. The verified response may then be returned to the user via the GUI of the user computing device 140 to provide the user with compliant, context-dependent information.

In some embodiments, the LLM orchestrated data search platform 110 may include hardware components such as a processor 118, which may include local or remote processing components. In some embodiments, the processor 118 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 118 may include data-processing capacity provided by the microprocessor. In some embodiments, the microprocessor may include memory, processing, interface resources, controllers, and counters. In some embodiments, the microprocessor may also include one or more programs stored in memory.

In some embodiments, the LLM orchestrated data search platform 110 may include data sources 120 including privately and/or publicly accessible information retrieval tools. In some embodiments, the data sources 120 may include one or more local and/or remote data storage solutions such as, e.g., local hard-drive, solid-state drive, flash drive, database or other local data storage solutions or any combination thereof, and/or remote data storage solutions such as a server, mainframe, database or cloud services, distributed database or other suitable data storage solutions or any combination thereof. In some embodiments, the data sources 120 may include, e.g., a suitable non-transient computer readable medium such as, e.g., random access memory (RAM), read only memory (ROM), one or more buffers and/or caches, among other memory devices or any combination thereof.

For example, the data sources 120 may include at least one database 122. The database may include a database model formed by one or more formal design and modeling techniques. The database model may include, e.g., a navigational database, a hierarchical database, a network database, a graph database, an object database, a relational database, an object-relational database, an entity-relationship database, an enhanced entity-relationship database, a document database, an entity-attribute-value database, a star schema database, or any other suitable database model and combinations thereof. For example, the database may include database technology such as, e.g., a centralized or distributed database, cloud storage platform, decentralized system, server or server system, among other storage systems. In some embodiments, the database may, additionally or alternatively, include one or more data storage devices such as, e.g., a hard drive, solid-state drive, flash drive, or other suitable storage device. In some embodiments, the database may, additionally or alternatively, include one or more temporary storage devices such as, e.g., a random-access memory, cache, buffer, or other suitable memory device, or any other data storage solution and combinations thereof.

Depending on the database model, one or more database query languages may be employed to retrieve data from the database. Examples of database query languages may include: JSONiq, LDAP, Object Query Language (OQL), Object Constraint Language (OCL), PTXL, QUEL, SPARQL, SQL, XQuery, Cypher, DMX, FQL, Contextual Query Language (CQL), AQL, among suitable database query languages.

In some embodiments, the data sources 120 may include one or more local and/or remote data integrations, such as a software service including, e.g., a security service 124, a cloud service 126, an internet-based content and/or information service via HTTP 128, among others or any combination thereof. In some embodiments, the LLM orchestrated data search platform 110 may interface with the data sources 120 via one or more computer interfaces. In some embodiments, the computer interfaces may utilize one or more software computing interface technologies, such as, e.g., an application programming interface (API) and/or application binary interface (ABI), among others or any combination thereof. In some embodiments, an API and/or ABI defines the kinds of calls or requests that can be made, how to make the calls, the data formats that should be used, the conventions to follow, among other requirements and constraints. An "application programming interface" or "API" can be entirely custom, specific to a component, or designed based on an industry-standard to ensure interoperability to enable modular programming through information hiding, allowing users to use the interface independently of the implementation.

In some embodiments, the LLM orchestrated data search platform 110 may be implemented as a centralized computing system, a computing device, a distributed computing system, a cloud hosted service and/or platform, a server-hosted platform, a hybrid cloud and local computing system, or any combination thereof. As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). The aforementioned examples are, of course, illustrative and not restrictive.

In some embodiments, the LLM orchestrated data search platform 110 may implement computer engines for the context engine 112, the model orchestration LLM 114, the compliance agent 116 and/or the agent(s) 130. In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth. In some embodiments, the computer engine(s) may include dedicated and/or shared software components, hardware components, or a combination thereof.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, the context engine 112 may dynamically contextually inject data at runtime into the model orchestration LLM 114, the agent(s) 130, or a combination thereof. The contextual data may be based on the user, security parameters or other data or any combination thereof. For example, the contextual data may include the user's role in an organization, a user type, a persona representative of a style of communication, a skill-level in one or more domains, domain-specific data, inferences from others of the model orchestration LLM 114 and/or agent(s) 130, among other data or any combination thereof. For example, the user may be querying financial instrument information associated with a financial instrument, a market, or other information, thus the contextual data may include bond data, market data, security and exchange commission (SEC) filing data, user activity, user persona/role information, among other data or any combination thereof.

In some embodiments, the contextual data may be stored in a user profile associated with the user, e.g., in the database 122 or other data store. In some embodiments, the contextual data may be retrieved via a query to a private and/or public data source 120, such as the Internet via HTTP 128, or any other suitable private and/or public data source or any combination thereof. For example, the security parameters may include, e.g., user location, user department, user firm, user entitlements, user job function, time of day, among others or any combination thereof, which may be used to determine an amount and type of information that the user may access.

Thus, in some embodiments, based on the user's role and persona, the context engine 112 retrieves data (over the internet, over local, over cloud) from multiple sources (API, flat files, databases) and inserts it into the model orchestration LLM 114 runtime context. In some embodiments, the injection may be done in memory and specific to the user's session. As a result, the context engine 112 prevents leakage of data to other users of the LLM orchestrated data search platform 110 since it is only dynamically retrieved at run time and specific to the user's commands.

In some embodiments, the context engine 112 may dynamically control the context kept in the runtime. Thus, in some embodiments, the context engine 112 may systematically reduce the context input into the model orchestration LLM 114 while preserving the meaning of context. In some embodiments, the model orchestration LLM 114 may have a limited context size, including both hard limits (there is a hard ceiling), and also semantic cognitive limits (e.g., the more in the context, the less attention is direct to the context). In some embodiments, to optimize the resource use and attention of the model orchestration LLM 114, the context engine 112 may dynamically reduce context size to balance continuity for the user with attention in the model orchestration LLM 114. To do so, the context engine 112 may review the conversation occurring via the GUI and determine how much conversation history is required to maintain the conversation. The context engine 112 performs this review dynamically and in conjunction with the injection of context data described above to enable seamless conversation across hundreds of messages or more.

In some embodiments, the balancing is configured to optimize based on one or more parameters, such as, e.g., recency (memory depth), stated importance, model capability, cost, attribute(s) of the conversation (e.g., industry, sector, investment grade versus high yield, or other attributes of the financial investment related conversations or any combination thereof) among others or any combination thereof. In some embodiments, recency refers to how recent the data is to be kept in the runtime. For example if the user asked for high yield bonds, and then next question 'just above 5% yield', it should know high yield bonds just above 5%. But if the user asked high yield bonds last week, it should not maintain that query in memory. In some embodiments, stated Importance refers to where the user inputs something that is clear in intent, the input is prioritized by applying a weighting based on the stated importance. In some embodiments, model capability refers to the limit of the context size available to the model orchestration LLM 114, such as, e.g., 4 KB, 8 kB, 16 kB or other limit to the amount that the memory can maintain. In some embodiments, the cost refers to the cost profiles for maintaining and running the model orchestration LLM 114 and/or the LLM orchestrated data search platform 110.

In some embodiments, the model orchestration LLM 114 may receive the natural language query from the user and the context from the context engine 112. In some embodiments, the GUI may also include structured commands (e.g., via user interface elements including buttons, toggles, switches, multiple choice selections, filters, etc.). The structured commands may be provided with the natural language query.

In some embodiments, based on the input, the model orchestration LLM 114 may load what the user and process conversation has been to the point in time into context, and compress what the user and process conversation has been to the point in time to optimize what is put into context as necessary. In some embodiments, given the above, the model orchestration LLM 114 may determine the type of response that is required, such as what data sources 120 and/or agent(s) 130 may fulfill the response 102. In some embodiments, given the type or response, the model orchestration LLM 114 may generate one or more retrieval instructions for each data source 120 and/or agent(s) 130 that may provide all or a portion of the response 102. In some embodiments, the model orchestration LLM 114 may collate the retrieved data and generate a natural language response 102 answering the user's query.

In some embodiments, to do so, the model orchestration LLM 114 may dynamically determine which sub-process (e.g., which agent(s) 130) to use to fulfill a user's inferred request. In some embodiments, to improve for scalability (in runtime performance, and also in expandability of the underlying model), the LLM orchestrated data search platform 110 may be configured to run the agent(s) 130 in parallel, enabling more agents to be created but also for agents to cooperate and work with each other, and agents that are adversarial and work against each other for the best result. In some embodiment, the agents 130 may be machine learning (ML)-based agents, an API call to an external service, a function call within a process, or a query, or other machine learning, statistical, programmatic and/or rules-based process or any combination thereof.

For example, in some embodiments, the model orchestration LLM 114 may generate instructions for a "sector search" agent that works with a 'cognition' agent to refine the user's request to search for the right market sectors, industries, and groupings most appropriate to the user's request for financial instrument information. Another example may include an "internet" agent that is able to retrieve real time data from internet sources such as via an API, and in conjunction with the above method, copy, move, download or other otherwise obtain the real-time data for use by the LLM orchestrated data search platform 110.

In some embodiments, the agents 130 and/or the model orchestration LLM 114 may include functionality for explainability (e.g., "Show Your Work") based on explainability programming. Machine learning models, such as neural networks and LLM's, among others, struggle with explainability, including explaining why a model inferred a specific output. In some embodiments, the agents 130 and/or the model orchestration LLM 114 may include dynamic, systematically created explainability suitable for the end user, e.g., an employee at a financial institution. In some embodiments, the explainability programming may include a method to create text explaining inner workings of the model orchestration LLM 114. Given a set of input text, the explainability functionality explains in text in language specific to the user's persona and security status the specific steps taken by the model orchestration LLM 114 (across multiple agents 130 when applicable) to fulfill the user's answers.

In some embodiments, the model orchestration LLM 114 may include explainability capabilities according to explainability programming. To do so, the model orchestration LLM 114 may track the instructions output in response to the user's query and dynamically and systematically create explainability suitable for the end user (e.g., based on the context data, such as an employee at a financial institution).

To do so, the model orchestration LLM 114 include the explainability programming may create text explaining the model orchestration LLM 114 inner workings. Given a set of input text, the model orchestration LLM 114 may generate a description of the instructions it produced and the data received based on the instructions to explain in text in language specific to the user's persona and security status the specific steps taken by the model orchestration LLM 114 (across multiple agents when applicable) to fulfill the user's answers. In some embodiments, these steps may describe the exact programmatic instructions the model took. For example, the model orchestration LLM 114 may decode model orchestration LLM 114 output that may include remote API calls, database queries, invocation of other agents (e.g., the data sources 120 and/or agents 130), and may even include security processes and timing.

In some embodiments, the explainability programming may include tracking the instructions by, e.g., storing a record of each instruction produced in a cache, buffer, memory or other temporary or permanent data store or any combination thereof. In some embodiments, the tracking may include monitoring the runtime of the model orchestration LLM 114 to view or otherwise access the instructions output by the model orchestration LLM 114.

In some embodiments, the explainability programming may also include tracking the agents 130 associated with each of the instructions produced by the model orchestration LLM 114 and/or the data received by each of the agents 130 in response to the instructions. In some embodiments, the explainability programming may include tracking may include, e.g., storing a record of each agent 130 and/or each response in a cache, buffer, memory or other temporary or permanent data store or any combination thereof. In some embodiments, the tracking may include monitoring the runtime of the model orchestration LLM 114 to view or otherwise access the agents 130 and/or the response associated with each instruction.

In some embodiments, based on the exemplary instructions, the agents 130 instructed and/or the response data from each agent 130, the explainability programming may cause the model orchestration LLM 114 to produce a natural language explanation of the steps taken in response to the user's request. The model orchestration LLM 114 may ingest each of the instructions, the agents 130 instructed and/or the response data from each agent 130 and apply the trained model parameters to produce the natural language explanation. The explainability programming may include triggering the model orchestration LLM 114 to output the natural language explanation based on a predefined prompt, prompt structure or prompt template configured to elicit the natural language explanation from the model orchestration LLM 114. In some embodiments, the model orchestration LLM 114 may produce the natural language explanation in a form based on the context detailed above, including the user's persona and/or security status, among other attributes or any combination thereof.

In some embodiments, the agent(s) 130 may include one or more ML-based and/or programmatic agents that receive the instructions from the model orchestration LLM 114 and output data based thereon. In some embodiments, each agent 130 may be task and/or domain specific, and thus may each perform a specific task and can be developed, benchmarked independently of other sub processes. In a world of AI where things are not always determinate, the model orchestration LLM 114 orchestration of task specific agents 130 enables better ability to develop and tweak faster in a way that does not impact end customers negatively. In some embodiments, the agents 130 are modular data processing components that multiple agents employ. An example is a gradual refinement of a retrieval instruction like a query. For example, when a user asks for a cruise bond, a first agent may not know what sector, industry, sub industry, etc. includes bonds in cruise industries. A secondary agent may be passed a draft query which is then refined with knowledge specific to sectors for bonds. Another example may include building composite responses to a query. A user may input a query for a particular type of financial instrument (e.g., according to size, liquidity, price, investment grade (IG), yield (such as high yield or junk, etc.), among other attributes). The model orchestration LLM 114 may coordinate multiple agents 130 for identifying, e.g., sector, industry, sub industry, composites of industries and/or sectors, etc. that include the queried type of financial instrument. In some embodiments, the agents 130 may interact through shared memory or through API calls to enable the cooperative and adversarial functionalities.

In some embodiments, some agents 130 may be adversarial agents that criticize another agent's 130 work, but not give the adversarial agents the same ruleset as the parent agent. For example, the adversarial agent may not base its output on what the parent agent was asked to do, just what the output of the parent agent was.

In some embodiments, in the financial instrument examples the agents 130 may include, e.g., a recognition agent, a retrieval agent, a symbol resolving agent, a sector resolving agent, the compliance agent 116, an aggregation agent, or a monitoring and classification agent, among others or a combination thereof.

In some embodiments, the recognition agent may include ML-based functionality to interpret a user's request and classifies the request into one or more classes and/or categories. In some embodiments, the classes and/or categories may include 1, 2, 3, 4, 5, 6, 7, 8, 9, 10 or more classes and/or categories. For example, the recognition agent may determine whether the user request relates to a financial instrument, a type of a financial instrument, a sector associated with a financial instrument, a market associated with a financial instrument, a geography associated with a financial instrument, among other categories and/or classes associated with the user request or any combination thereof.

In some embodiments, the recognition agent may include supervised machine learning to train parameters of one or more classifier models of the recognition agent. Accordingly, in some embodiments, the parameters of the classifier model may be trained based on known outputs. For example, a training input query may be paired with a target classification or known classification to form a training pair, such as an observed result and/or human annotated classification. In some embodiments, the training query may be provided to the classifier model to produce a predicted class. In some embodiments, an optimizer associated with the classifier model may then compare the predicted class with the known output of a training pair to determine an error of the predicted class. In some embodiments, the optimizer may employ a loss function, such as, e.g., Hinge Loss, Multi-class SVM Loss, Cross Entropy Loss, Negative Log Likelihood, or other suitable classification loss function to determine the error of the predicted label based on the known output.

In some embodiments, the known output may be obtained after the classifier model produces the prediction, such as in online learning scenarios. In such a scenario, the classifier model may receive the user's request and generate the classes and/or categories classifying the user's query. Subsequently, a user may provide feedback by, e.g., modifying, adjusting, removing, and/or verifying the class/category via a suitable feedback mechanism, such as a user interface device (e.g., keyboard, mouse, touch screen, user interface, or other interface mechanism of a user device or any suitable combination thereof). The feedback may be paired with the user's request to form the training pair and the optimizer may determine an error of the predicted class/category using the feedback.

In some embodiments, based on the error, the optimizer may update the parameters of the classifier model using a suitable training algorithm such as, e.g., backpropagation for a classifier machine learning model. In some embodiments, backpropagation may include any suitable minimization algorithm such as a gradient method of the loss function with respect to the weights of the classifier machine learning model. Examples of suitable gradient methods include, e.g., stochastic gradient descent, batch gradient descent, mini-batch gradient descent, or other suitable gradient descent technique. As a result, the optimizer may update the parameters of the classifier model based on the error of predicted classes and/or categories in order to train the classifier model to model the correlation between a user's request and the classes and/or categories that are subject of the user's request.

In some embodiments, the agents 130 may include one or more retrieval agents. In some embodiments, the retrieval agents may include scripts and/or programs configured to retrieve data from internal and/or external sources, such as a data store of the LLM orchestrated data search platform 110 or via the Internet, respectively. For example, one or more retrieval agents may include software daemons that retrieve data, including automatically generating inputs and normalizing the outputs for downstream processes. For example, the software daemons can include one or more web crawlers, database query scripts, API query scripts, among others or any combination thereof.

In some embodiments, the agents 130 may include a symbol resolving agent. In some embodiments, the symbol resolving agent may be employed as a variation of the retrieval agent where the recognition agent identifies one or more symbols in the user's query that is indicative of a financial instrument. For example, when the recognition agent determines that the question is about one or more companies, the symbol resolving agent may look at the context of the user's question and determine which of the tokens are financial instrument symbols and get the associated data on those symbols, which may then be injected into downstream processes.

In some embodiments, the agents 130 may include an aggregation agent. When one or more retrieval agents retrieve data to fulfill the user's request, the aggregation agent may format the content of the data into a single cohesive output for the user. In some embodiments, for example, the aggregation agent may include one or more ML models to identify the most relevant elements to the user's request.

To do so, in some embodiments, the aggregation agent may include supervised machine learning to train parameters of one or more data element models of the aggregation agent. Accordingly, in some embodiments, the parameters of the aggregation AI model may be trained based on known outputs. For example, a training input query may be paired with a target data element or known data element to form a training pair, such as an observed result and/or human annotated data element. In some embodiments, the training query may be provided to the model to produce a predicted data element, such as by scoring a relevance of each data element received by retrieval agents. In some embodiments, an optimizer associated with the model may then compare the predicted data element with the known output of a training pair to determine an error of the predicted data element. In some embodiments, the optimizer may employ a loss function, such as, e.g., Hinge Loss, Multi-data element SVM Loss, Cross Entropy Loss, Negative Log Likelihood, or other suitable data element loss function to determine the error of the predicted data element based on the known output.

In some embodiments, the known output may be obtained after the model produces the prediction, such as in online learning scenarios. In such a scenario, the model may receive the user's request and generate the data elements relevant to the user's query. Subsequently, a user may provide feedback by, e.g., modifying, adjusting, removing, and/or verifying the data element relevance via a suitable feedback mechanism, such as a user interface device (e.g., keyboard, mouse, touch screen, user interface, or other interface mechanism of a user device or any suitable combination thereof). The feedback may be paired with the user's request to form the training pair and the optimizer may determine an error of the predicted data element using the feedback.

In some embodiments, based on the error, the optimizer may update the parameters of the model using a suitable training algorithm such as, e.g., backpropagation for a machine learning model. In some embodiments, backpropagation may include any suitable minimization algorithm such as a gradient method of the loss function with respect to the weights of the machine learning model. Examples of suitable gradient methods include, e.g., stochastic gradient descent, batch gradient descent, mini-batch gradient descent, or other suitable gradient descent technique. As a result, the optimizer may update the parameters of the model based on the error of predicted data elements in order to train the model to model the correlation between a user's request and relevance of data elements retrieved by retrieval agents.

In some embodiments, the agents 130 may include a user recommendation model that employs one or more machine learning models to recommend, in response to the user's request, other users that the user may wish to engage with. In some embodiments, for example, the user recommendation model may ingest the user's request and identify other users that may be associated with the content of the user's request. For example, the user recommendation model may assist dealers in selecting client(s) for a trade described in the user's request based on client(s)'s probability to trade a particular financial instrument described in the user's request or otherwise associated with the content of the user's request (e.g., based on data retrieved by the retrieval agent(s)). In some embodiments, the one or more machine learning models of the user recommendation model may leverage neural networks for their prediction component and an Adam optimizer (or other optimizer or combination thereof) for network parameter updates.

In some embodiments, many domains for recommendation to users may be complex ecosystems with numerous users and/or content interacting in various capacities. Traditionally, recommendation models have employed methods such as Collaborative Filtering (CF) and Matrix Factorization (MF). However, these methodologies often need to encapsulate the intricate, non-linear relationships present. To overcome these limitations, the user recommendation model may employ neural networks and the Adam optimizer. Neural networks have shown prowess in capturing intricate dependencies among variables, outperforming traditional linear models. The Adam optimizer, with its ability to handle sparse gradients on noisy problems, brings in adaptive learning rates for different parameters. These capabilities make these techniques apt for the user recommendation model.

In some embodiments, the user recommendation model may include a neural network with multiple hidden layers. In the example of financial instrument trading, inputs may include client and dealer information and other additional market features. The output is a score indicating a client's potential for a particular dealer and CUSIP. In some embodiments, the user recommendation model may include:

a. Embedding Layer: the client, dealer, and market data obtained, e.g., via the model orchestration LLM 114 from the user request, may be processed through an embedding layer that transforms these categorical variables into continuous embeddings. These embeddings capture the latent characteristics of clients and dealers.

b. Hidden Layers: The embeddings may flattened, concatenated to form a dense vector, and passed through a series of fully connected hidden layers. Each layer applies a non-linear transformation, facilitating the model to learn complex interaction patterns.

c. Output Layer: The final layer of the neural network may be a single neuron that produces a predicted preference score. This score aids in ranking users for recommendation in response to the user request based on their probability to trade a particular bond.

In some embodiments, the train the user recommendation model, an Adam optimizer may be employed. The Adam optimizer is efficient, has low memory requirements, and is suitable for problems with large datasets or parameters. The Adam optimizer calculates individual adaptive learning rates for different parameters. In some embodiments, because the interactions between users may have sparse and/or noisy data, the ability of the Adam optimizer to calculate individual adaptive learning rates for different parameters may by beneficial. In some embodiments, using the Adam optimizer, the user recommendation model may be trained by minimizing a loss function that evaluates the discrepancy between predicted and actual user interactions.

In some embodiments, the agents 130 may include a data similarity model. In some embodiments, the recognition agent and/or the model orchestration LLM 114 may identify one or more data elements, concepts, or other items in the user request. In some embodiments, the data similarity model may search a catalog of other data items and surface data that is within a threshold degree of similarity to the user request. In some embodiments, the data similarity model may employ a quantifiable distance metric between two data items, such as financial instruments, reflecting their similarity/dissimilarity. In some embodiments, the data similarity model may use clustering models that calculate the similarity distance metric. In some embodiments, the data similarity model may first convert the idea of each data item into numerical form and then define a set of features that describe each data item best. In some embodiments, the data similarity model may then compute the distance between the features of the two data items and use that as a similarity metric. Accordingly, the input is two data items, such as two financial instruments, and the output is a single continuous distance value (e.g., Euclidean distance, Cosine similarity, Jaccard distance, etc.). The most similar data items have the smallest distance between each other may be surfaced in response to the user's request.

In some embodiments, for data items such as financial instruments, e.g., bonds, the features describing each bond may include, e.g., Market Sector (Corp/Sov/Muni/etc.), bb_market_sector, • Industry Sector (ice_entity_sector), 144a status (yes or no), • Callable status (yes or no), Putable status (yes or no), Rating (ltx_rating aggregation metric), CUSIP count for the ticker (a proxy for ticker), OAS duration (maturity adjusted for embedded options), Coupon rate, Original Issue amount, Amount Outstanding, Coupon class id (Fixed/Float/step/etc.) (coupon_class_id), Is Financial Flag, Benchmark Alias, Spread, Total returns (delta price between quarter), among others or any combination thereof. The features may be one-hot encoded so that the distance between any two bonds may be measured with a distance measure (e.g., Euclidean distance, Cosine similarity, Jaccard distance, etc.) between vectors representing each set of features to. The distance represents the similarity.

In some embodiments, the agents 130 may include a dealer selection score model. In some embodiments, the user request may include a search for a dealer of a financial instrument that the user may use to buy and/or sell a financial instrument. The model orchestration LLM 114 and/or the recognition agent may identify the financial instrument and/or attributes thereof in the user request and call the dealer selection score model to score dealers on ability to buy and/or sell the financial instrument. In some embodiments, the dealer selection score model may use a machine learning-based logistic regression model to generate the score. Leveraging machine learning algorithms can enhance decision-making processes on the buy side by systematically identifying the optimal dealer(s) for a particular trade by analyzing historical data and learning patterns. Thus, the dealer selection score model may pinpoint the optimal dealers by considering a range of data retrieved from various sources (e.g., via the retrieval agent(s)), such as dealer axes, similar bond axes, past performance, pricing, and market depth-related parameters. In some embodiments, the use of logistic regression may provide a robust score that informs the dealer selection process.

In some embodiments, the dealer selection score model may utilize class imbalance, cross validation and/or modeling to score dealers for the user request. In some embodiments, the class imbalance may be address by oversampling and/or under sampling methods to balance the class label. In some embodiments, cross validation may be performed to avoid overfitting, ensuring the dealer selection score model maintains accuracy and generalizability on time series data and preserving the temporal dependency between observations during testing.

In some embodiments, the agents 130 may include a compliance agent. In some embodiments, the compliance agent may include one or more ML-based models that takes as input text or intents from upstream agents and determines whether it meets a configured ruleset. The ruleset itself can be provided in natural language. Recursive capability continuously modifies the input text/intents until compliance is met, while logging each of the changes made to the text/intents. Large language models are susceptible to hallucination, this is a side effect of how many large language models are trained. In financial services applications where the provider of the chat service is a regulated entity, tolerance for hallucinations is low. In some embodiments, the compliance agent 116 may be an adversarial agent that tests the response 102 to ensure compliance. For example, in financial-related and/or health-related implementations, certain rules, regulations and/or guidelines must be followed to meet industry standards. Thus, the compliance agent 116 works separate to the text generation, retrieval, agents and does not know what the user's request is. Instead, the compliance agent 116 may first test whether the text meets a compliance ruleset, and secondly, progressively modify the text until it is compliant. In some embodiments, the compliance agent 116 may progressively modify the test by applying small variations that do not change the meaning of the response 102 until the response 102 meets the compliance ruleset.

To do so, the compliance agent 116 may systematically ingest rule sets (e.g., in XML, csv, plain text, etc.) from compliance processes/systems/humans and codify the ruleset into a "prompt" that the model orchestration LLM 114 can interpret. The model orchestration LLM 114 may then infer a pass or fail of the response 102 from the rule set and determine whether it meets the regulated entity's compliance standards or not. In some embodiments, the compliance agent 116 may be trained using subject matter expertise from a compliance officer, from existing rulesets from existing compliance rule based systems, among other sources of truth or any combination thereof.

In some embodiments, in this manner, the compliance agent 116 may work adversarial with the model orchestration LLM 114 to dynamically, recursively, correct model orchestration LLM 114 output based on systematic review until the response passes. As a result, the compliance agent 116 may algorithmically auto correct the response 102 until it passes the systematic review, preserving original intent and making as minor changes as possible until it passes. This is done in an adversarial manner, where an agent does this autonomously without knowing the context or the reasoning behind the original text.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

a. define Neural Network architecture/model,
b. transfer the input data to the exemplary neural network model,
c. train the exemplary model incrementally,
d. determine the accuracy for a specific number of timesteps,
e. apply the exemplary trained model to process the newly-received input data,
f. optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

Figure 2:
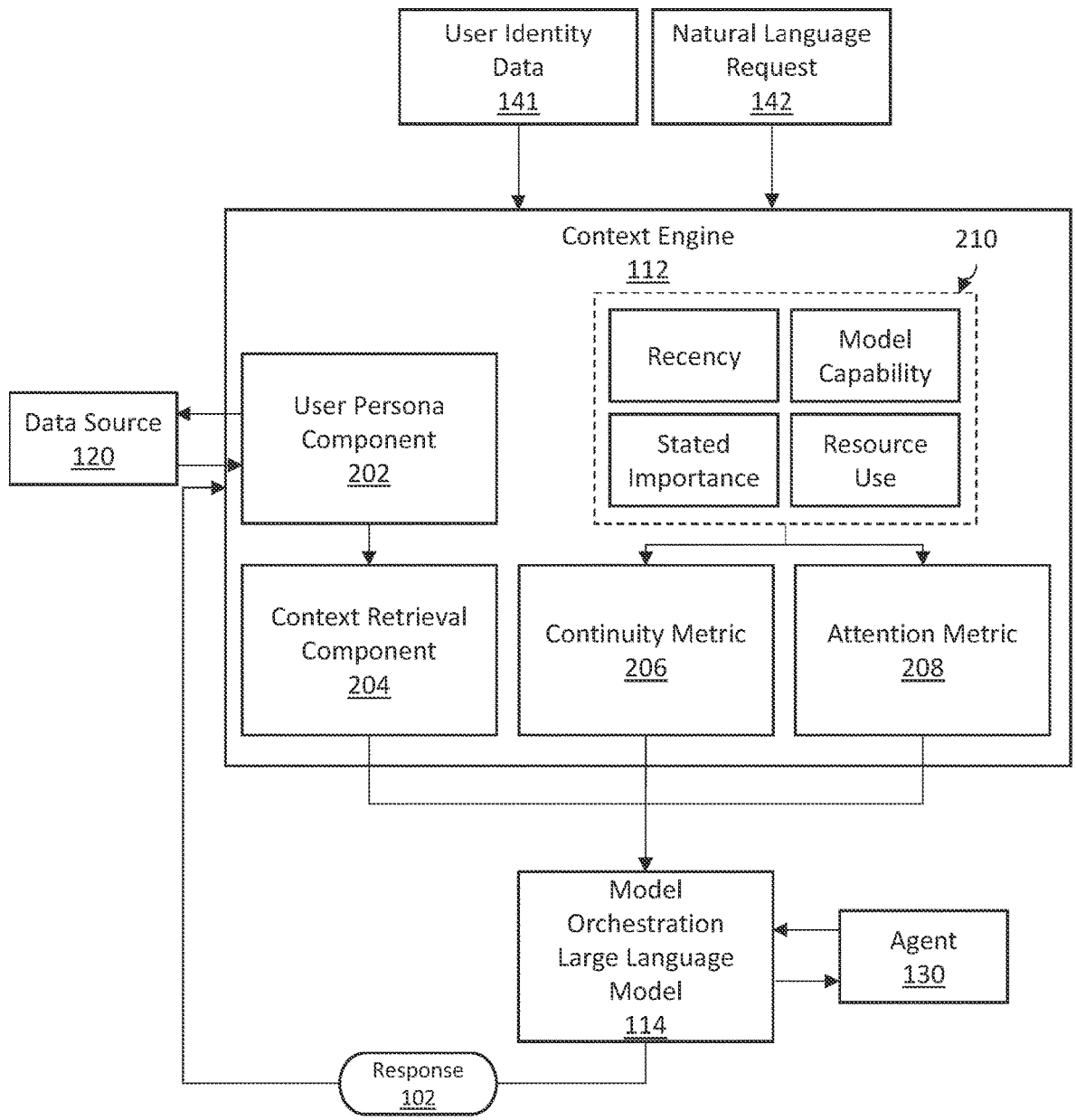
FIG. 2 depicts a context engine for injecting and configuring context in a run-time of the large language model (LLM) orchestrated data search across public and private data sources in accordance with one or more embodiments of the present disclosure.

Referring now to FIG. 2, a context engine for injecting and configuring context in a run-time of the large language model (LLM) orchestrated data search across public and private data sources is depicted in accordance with one or more embodiments of the present disclosure.

In some embodiments, the context engine 112 may receive the natural language request 142 and user identity data 141 associated with the user. Based on the user identity data 141, a user persona component 202 may query one or more data sources 120 for user persona attributes. The user persona attributes may include at least one of a user role, or at least one security parameter associated with the user. In some embodiments, a context retrieval component 204 may generate context data representative of the context of the natural language request 142 based on the user persona attributes.

In some embodiments, the context engine 112 may also implement a continuity metric 206 and an attention metric 208 to optimize continuity and attention of the model orchestration LLM 114 based on optimization parameters 210. In some embodiments, the optimization parameters 210 may include, e.g., recency, stated importance, model capability, resource user, among others or any combination thereof. Based on the optimization parameters 210 the context engine 112 may generate a continuity metric 206 balanced with an attention metric 208 to determine an amount of data to maintain in the runtime of the model orchestration LLM 114.

In some embodiments, the context engine 112 may perform one or more of the following steps:

a. 1. Evaluate the latest input question—score the complexity of the question and the approximate length of response;
b. 2. Evaluation of conversation depth, e.g., how many 'turns', how many tokens used, key topics in aggregate, (e.g., summarized using the model orchestration LLM 114 as a separate agent), key themes of each turn, error rates;
c. 3. Tweak each of the parameters of the conversation (e.g., turns, tokens, key topic, key themes, error rates, etc.) along a hierarchy;
   i. If less than a threshold number of turns, then no changes required,
   ii. If less than a threshold number of tokens, then no changes required,
   iii. If more than the threshold number of turns or the threshold number of tokens, then compress the individual elements of chat history using key topics agent of the agents 130.
   iv. If there is still more than the threshold number of turns or the threshold number of tokens, then summarize chunks of chat history.

For example, if the user input a request asking for a list of bonds, the model orchestration LLM 114 may not need to know the list of bonds to establish continuity, just what the search was.

In some embodiments, the context engine 112 may adjust the runtime of the model orchestration LLM 114 based on the continuity metric 206 and the attention metric 208, and inject the context data into the model orchestration LLM 114 based on the runtime. As result, the natural language request 142 may be input into the model orchestration LLM 114 to output at least one instruction based on the context data and an optimized balance between continuity and attention. This balancing may be performed dynamically throughout a conversation between the model orchestration LLM 114 and the user.

Figure 3:
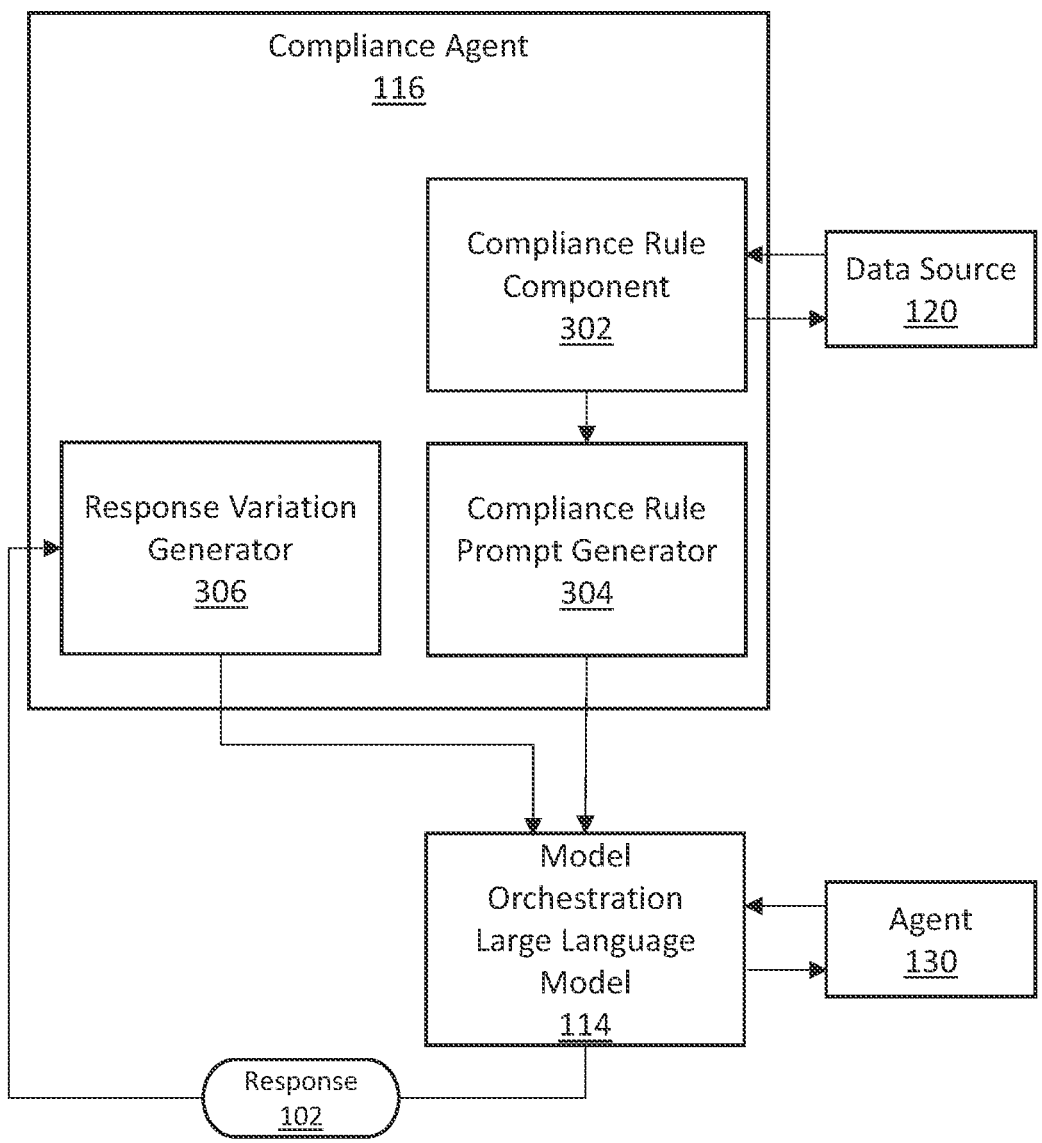
FIG. 3 depicts a compliance agent for verifying and ensuring compliance to a ruleset for large language model (LLM) orchestrated data search across public and private data sources in accordance with one or more embodiments of the present disclosure.

Referring now to FIG. 3, a compliance agent for verifying and ensuring compliance to a ruleset for large language model (LLM) orchestrated data search across public and private data sources is depicted in accordance with one or more embodiments of the present disclosure.

In some embodiments, the compliance agent 116 may include a compliance rule component 302 configured to access a compliance ruleset in a data source 120. In some embodiments, a compliance rule prompt generator 304 may include at least one compliance verification machine learning agent configured to ingest the compliance ruleset and output at least one compliance verification prompt based at least in part on compliance verification parameters. The at least one compliance verification prompt is configured to cause the model orchestration LLM 114 to verify compliance of the response 102 with the compliance ruleset.

In some embodiments, the at least one compliance verification prompt may be input into the model orchestration LLM 114 to output at least one compliance verification of the response 102 based at least in part on the trained parameters of the model orchestration LLM 114 and on the context attributes provided by the context engine 112 as detailed above.

In some embodiments, where the compliance verification is an indication of a failure or non-compliance, the response 102 may be input a response variation generator 306 of the compliance agent 116 to output a variation to the response 102. In some embodiments, the variation to the response 102 may be input into the model orchestration LLM 114 with the at least one compliance verification prompt to output at least one new compliance verification of the variation to the response 102. This process may be repeated until the response 102 is determined to have passed the compliance ruleset.

Figure 4:
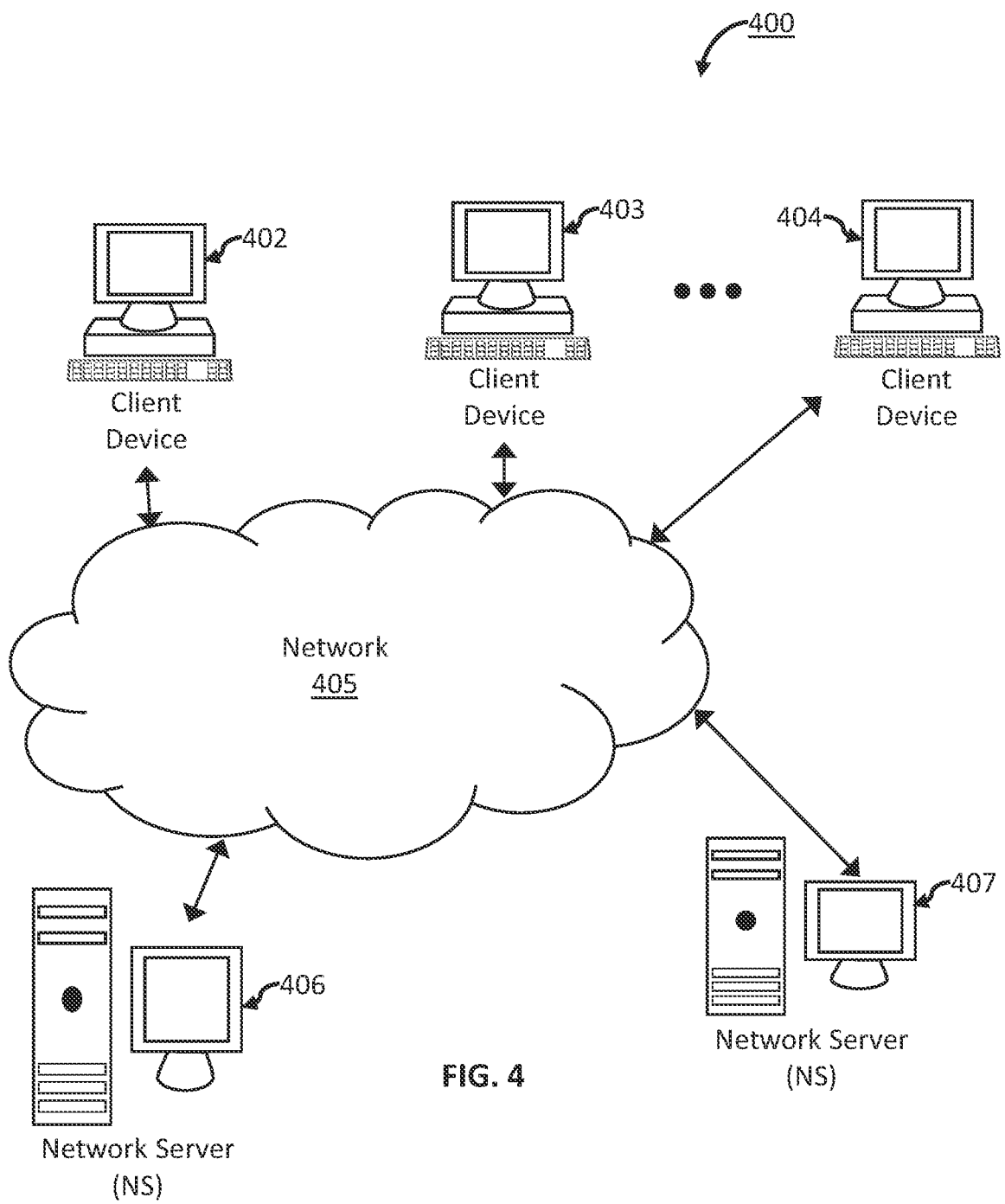
FIG. 4 depicts a block diagram of an exemplary computer-based system and platform for large language model (LLM) orchestrated data search across public and private data sources in accordance with one or more embodiments of the present disclosure.

FIG. 4 depicts a block diagram of an exemplary computer-based system and platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 400 may be configured to manage a large number of members and concurrent transactions, as detailed herein. In some embodiments, the exemplary computer-based system and platform 400 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 4, client device 402, client device 403 through client device 404 (e.g., clients) of the exemplary computer-based system and platform 400 may include virtually any computing device capable of receiving and sending a message over a network (e.g., cloud network), such as network 405, to and from another computing device, such as servers 406 and 407, each other, and the like. In some embodiments, the client devices 402 through 404 may be personal computers, multiprocessor systems, microprocessor-based or programmable consumer electronics, network PCs, and the like. In some embodiments, one or more client devices within client devices 402 through 404 may include computing devices that typically connect using a wireless communications medium such as cell phones, smart phones, radio frequency (RF) devices, infrared (IR) devices, integrated devices combining one or more of the preceding devices, or virtually any mobile computing device, and the like. In some embodiments, one or more client devices within client devices 402 through 404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more client devices within client devices 402 through 404 may include may run one or more applications, such as Internet browsers, mobile applications, voice calls, video games, videoconferencing, and email, among others. In some embodiments, one or more client devices within client devices 402 through 404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a client device within client devices 402 through 404 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a client device may periodically report status or send alerts over text or email. In some embodiments, a client device may contain a data recorder which is remotely downloadable by the user using network protocols such as FTP, SSH, or other file transfer mechanisms. In some embodiments, a client device may provide several levels of user interface, for example, advance user, standard user. In some embodiments, one or more client devices within client devices 402 through 404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Apache on Linux or Microsoft IIS (Internet Information Services). In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the client devices 401 through 404.

In some embodiments and, optionally, in combination of any embodiment described above or below, for example, one or more exemplary computing client devices 402 through 404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 5:
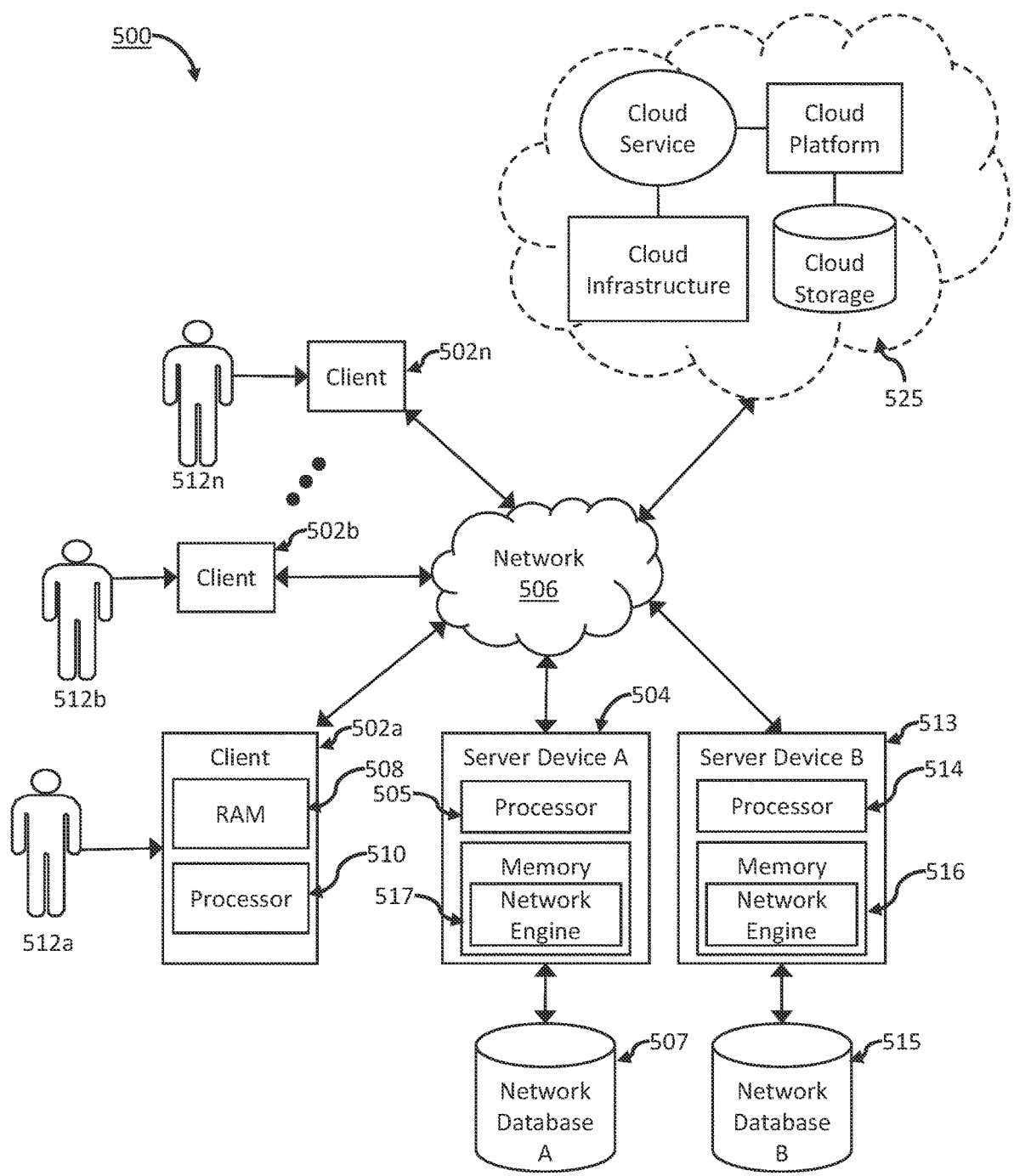
FIG. 5 depicts a block diagram of another exemplary computer-based system and platform for large language model (LLM) orchestrated data search across public and private data sources in accordance with one or more embodiments of the present disclosure.

FIG. 5 depicts a block diagram of another exemplary computer-based system and platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the client device 502a, client device 502b through client device 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client device 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, client devices 502a through 502n may also comprise a number of external or internal devices such as a mouse, a CD-ROM, DVD, a physical or virtual keyboard, a display, or other input or output devices. In some embodiments, examples of client devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, client devices 502a through 502n may be specifically programmed with one or more application programs in accordance with one or more principles/methodologies detailed herein. In some embodiments, client devices 502a through 502n may operate on any operating system capable of supporting a browser or browser-enabled application, such as Microsoft™, Windows™, and/or Linux. In some embodiments, client devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, user 512a, user 512b through user 512n, may communicate over the exemplary network 506 with each other and/or with other systems and/or devices coupled to the network 506. As shown in FIG. 5, exemplary server devices 504 and 513 may include processor 505 and processor 514, respectively, as well as memory 517 and memory 516, respectively. In some embodiments, the server devices 504 and 513 may be also coupled to the network 506. In some embodiments, one or more client devices 502a through 502n may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
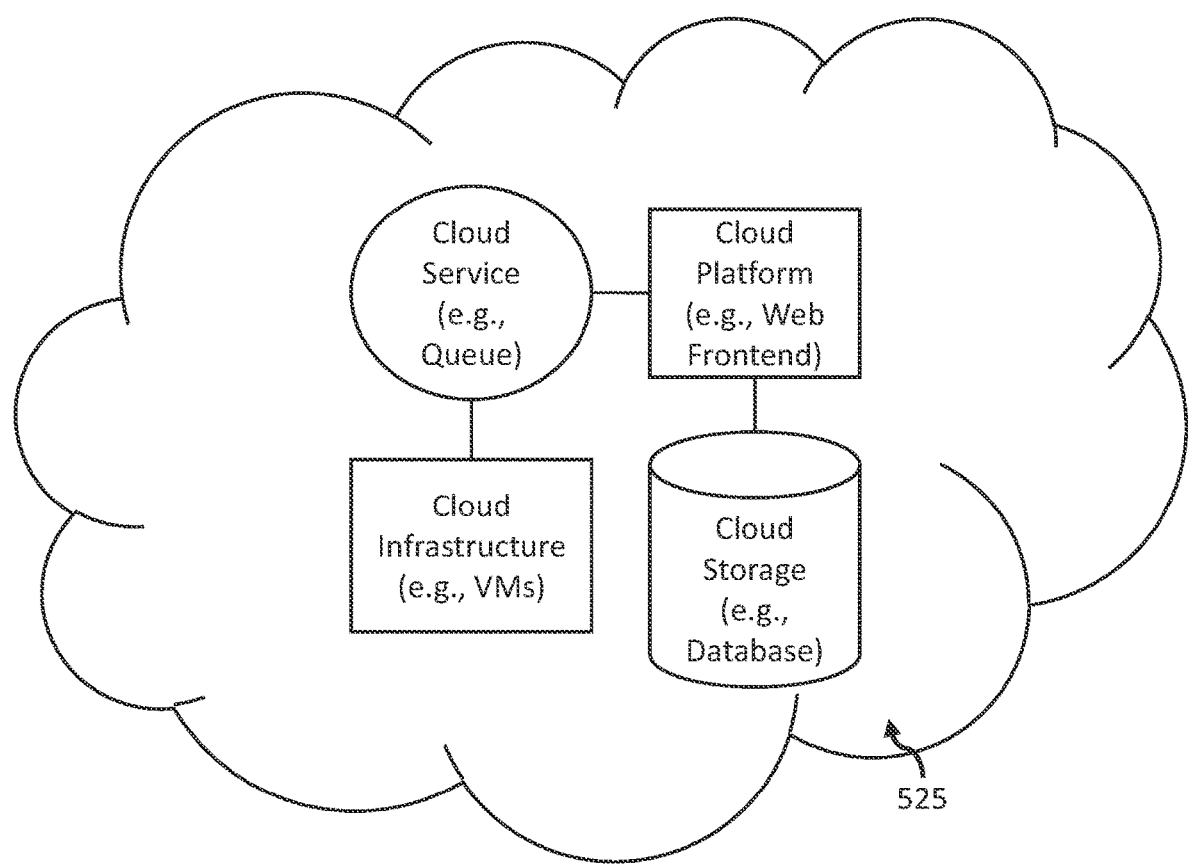
FIG. 6 depicts illustrative schematics of an exemplary implementation of the cloud computing/architecture(s) in which embodiments of a system for large language model (LLM) orchestrated data search across public and private data sources may be specifically configured to operate in accordance with some embodiments of the present disclosure.
Figure 7:
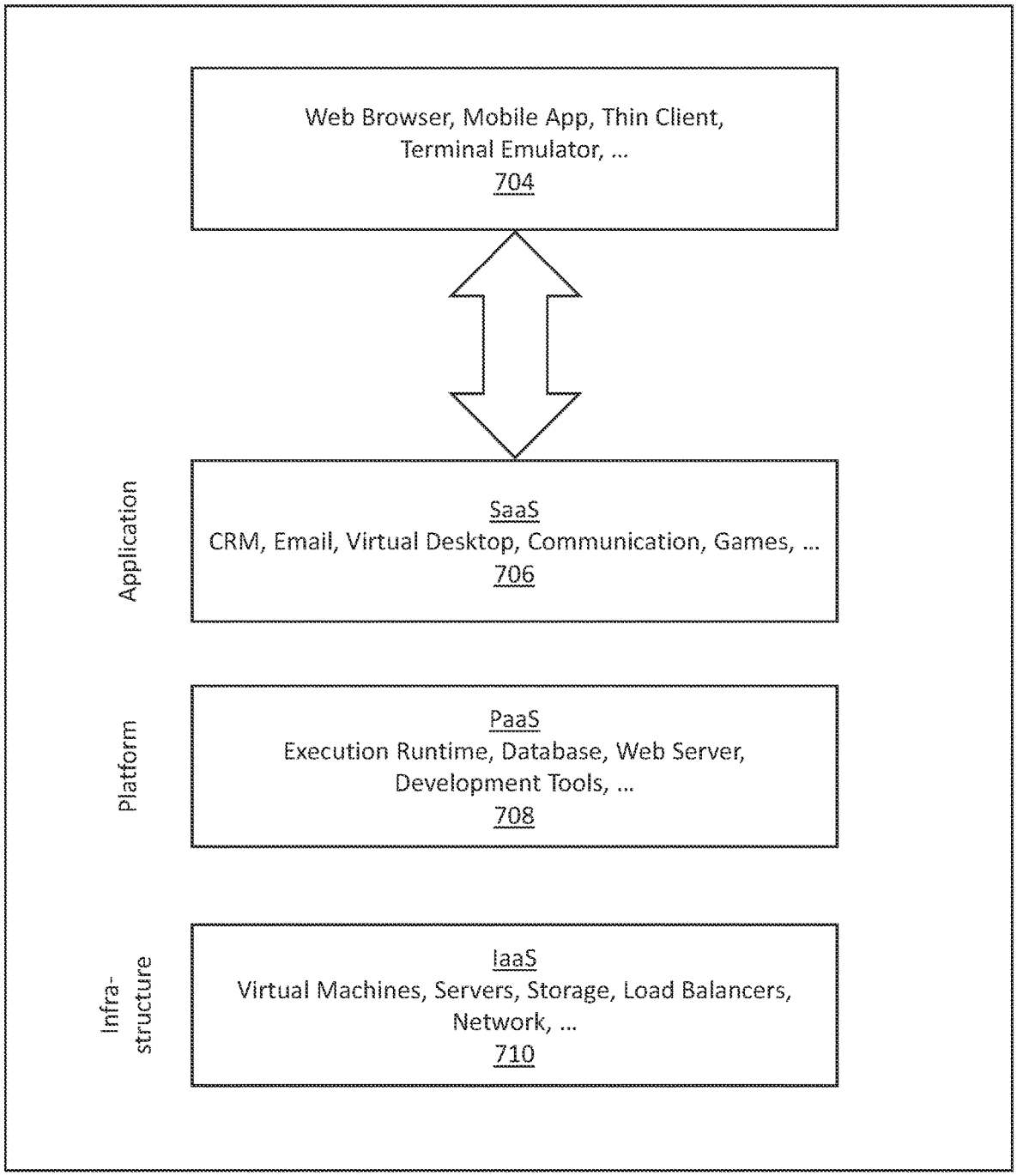
FIG. 7 depicts illustrative schematics of another exemplary implementation of the cloud computing/architecture(s) in which embodiments of a system for large language model (LLM) orchestrated data search across public and private data sources may be specifically configured to operate in accordance with some embodiments of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/architecture 525 such as, but not limiting to: infrastructure a service (IaaS) 710, platform as a service (PaaS) 708, and/or software as a service (SaaS) 706 using a web browser, mobile app, thin client, terminal emulator or other endpoint 704. FIGS. 6 and 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) Open VMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application. or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

Clause 1. A method including: receiving, by at least one processor from at least one user computing device associated with a user, a user-provided data record query including a natural language request to perform at least one action with at least one data record; determining, by the at least one processor, a user profile associated with the user; where the user profile includes user persona attributes; where the user persona attributes include at least one of: a user role, or at least one security parameter associated with the user; generating, by the at least one processor, based on the user persona attributes of the user profile, at least one context query to at least one data source so as to obtain at least one context attribute associated with the data record query; inputting, by the at least one processor, the at least one context attribute into a model orchestration large language model to inject context into a model orchestration large language model runtime of the model orchestration large language model; inputting, by the at least one processor, the natural language request of the data record query as a data record query prompt into the model orchestration large language model to output at least one instruction to at least one data record processing machine learning agent of a plurality of data record processing machine learning agents based at least in part on trained parameters of the model orchestration large language model and the at least one context attribute; inputting, by the at least one processor, the at least one instruction into the at least one data record processing machine learning agent to output at least one response; inputting, by the at least one processor, the at least one response as a response prompt into the model orchestration large language model to output to the user computing device at least one natural language response representative of the at least one action based at least in part on trained parameters of the model orchestration large language model and the at least one context attribute; and causing to display, by the at least one processor, the at least one natural language response in a graphical user interface (GUI) rendered on the user computing device.

Clause 2. The method of clause 1, where the plurality of data record processing machine learning agents are configured to be instantiated in parallel.

Clause 3. The method of clause 1, where the at least one data record processing machine learning agent is configured to utilize at least one modular shared data processing component to output the at least one response.

Clause 4. The method of clause 1, where the at least one data record processing machine learning agent is at least two data record processing machine learning agents; where at least one first data record processing machine learning agent is adversarial to at least one second data record processing machine learning agent.

Clause 5. The method of clause 4, where the at least one first data record processing machine learning agent is configured to output the at least one response; and where the at least one second data record processing machine learning agent is configured to: ingest the at least one response from the at least one first data record processing machine learning agent; determine a correctness assessment based at least in part on correctness assessment machine learning parameters; and refine the at least one response based at least in part on the correctness assessment.

Clause 6. The method of clause 1, further including: inputting, by the at least one processor, at least one compliance rule into at least one compliance verification machine learning agent to output at least one compliance verification prompt based at least in part on a plurality of compliance verification parameters; where the at least one compliance verification prompt is configured to cause the model orchestration large language model to verify compliance of the at least one natural language response with the at least one compliance rule; and inputting, by the at least one processor, the at least one compliance verification prompt into the model orchestration large language model to output at least one compliance verification of the at least one natural language model based at least in part on the trained parameters of the model orchestration large language model and the at least one context attribute.

Clause 7. The method of clause 6, further including: inputting, by the at least one processor, based on the at least one compliance verification being representative of the at least one natural language response being non-compliant, the natural language response into at least one compliance machine learning agent to output a variation to the natural language response; inputting, by the at least one processor, the at least one compliance verification prompt and the variation to the natural language response into the model orchestration large language model to output at least one new compliance verification of the variation to the at least one natural language model based at least in part on the trained parameters of the model orchestration large language model and the at least one context attribute.

Clause 8. The method of clause 6, where the at least one compliance verification includes at least one of: a pass indicative of the at least one natural language response being compliant, or a fail indicative of the at least one natural language response being non-compliant.

Clause 9. The method of clause 1, where the at least one instruction includes at least one programmatic step including at least one of: at least one database query, at least one application programming interface (API) call, or at least one internet search query.

Clause 10. The method of clause 9, further including: tracking, by the at least one processor, the at least one instruction; generating, by the at least one processor, at least one model explainability prompt representative of the at least one instruction; where the at least one model explainability prompt is configured to cause the model orchestration large language model to output a natural language explanation of at least one of: the at least one data record processing machine learning agent, or the at least one programmatic step; and inputting, by the at least one processor, the at least one model explainability prompt into the model orchestration large language model to output the natural language explanation based at least in part on the trained parameters of the model orchestration large language model and the at least one context attribute.

Clause 11. A system including: at least one processor in communication with at least one non-transitory computer readable medium having software instructions stored thereon, where the at least one processor, upon execution of the software instructions, is configured to: receive, from at least one user computing device associated with a user, a user-provided data record query including a natural language request to perform at least one action with at least one data record; determine a user profile associated with the user; where the user profile includes user persona attributes; where the user persona attributes include at least one of: a user role, or at least one security parameter associated with the user; generate based on the user persona attributes of the user profile, at least one context query to at least one data source so as to obtain at least one context attribute associated with the data record query; input the at least one context attribute into a model orchestration large language model to inject context into a model orchestration large language model runtime of the model orchestration large language model; input the natural language request of the data record query as a data record query prompt into the model orchestration large language model to output at least one instruction to at least one data record processing machine learning agent of a plurality of data record processing machine learning agents based at least in part on trained parameters of the model orchestration large language model and the at least one context attribute; input the at least one instruction into the at least one data record processing machine learning agent to output at least one response; input the at least one response as a response prompt into the model orchestration large language model to output to the user computing device at least one natural language response representative of the at least one action based at least in part on trained parameters of the model orchestration large language model and the at least one context attribute; and cause to display the at least one natural language response in a graphical user interface (GUI) rendered on the user computing device.

Clause 12. The system of clause 11, where the plurality of data record processing machine learning agents are configured to be instantiated in parallel.

Clause 13. The system of clause 11, where the at least one data record processing machine learning agent is configured to utilize at least one modular shared data processing component to output the at least one response.

Clause 14. The system of clause 11, where the at least one data record processing machine learning agent is at least two data record processing machine learning agents; where at least one first data record processing machine learning agent is adversarial to at least one second data record processing machine learning agent.

Clause 15. The system of clause 14, where the at least one first data record processing machine learning agent is configured to output the at least one response; and where the at least one second data record processing machine learning agent is configured to: ingest the at least one response from the at least one first data record processing machine learning agent; determine a correctness assessment based at least in part on correctness assessment machine learning parameters; and refine the at least one response based at least in part on the correctness assessment.

Clause 16. The system of clause 11, where the at least one processor is further configured to: input at least one compliance rule into at least one compliance verification machine learning agent to output at least one compliance verification prompt based at least in part on a plurality of compliance verification parameters; where the at least one compliance verification prompt is configured to cause the model orchestration large language model to verify compliance of the at least one natural language response with the at least one compliance rule; and input the at least one compliance verification prompt into the model orchestration large language model to output at least one compliance verification of the at least one natural language model based at least in part on the trained parameters of the model orchestration large language model and the at least one context attribute.

Clause 17. The system of clause 16, where the at least one processor is further configured to: input based on the at least one compliance verification being representative of the at least one natural language response being non-compliant, the natural language response into at least one compliance machine learning agent to output a variation to the natural language response; input the at least one compliance verification prompt and the variation to the natural language response into the model orchestration large language model to output at least one new compliance verification of the variation to the at least one natural language model based at least in part on the trained parameters of the model orchestration large language model and the at least one context attribute.

Clause 18. The system of clause 16, where the at least one compliance verification includes at least one of: a pass indicative of the at least one natural language response being compliant, or a fail indicative of the at least one natural language response being non-compliant.

Clause 19. The system of clause 11, where the at least one instruction includes at least one programmatic step including at least one of: at least one database query, at least one application programming interface (API) call, or at least one internet search query.

Clause 20. The system of clause 19, where the at least one processor is further configured to: track the at least one instruction; generate at least one model explainability prompt representative of the at least one instruction; where the at least one model explainability prompt is configured to cause the model orchestration large language model to output a natural language explanation of at least one of: the at least one data record processing machine learning agent, or the at least one programmatic step; and input the at least one model explainability prompt into the model orchestration large language model to output the natural language explanation based at least in part on the trained parameters of the model orchestration large language model and the at least one context attribute.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method comprising:
   receiving, by at least one processor from at least one user computing device associated with a user, a user-provided data record query comprising a natural language request to perform at least one action with at least one data record;
   determining, by the at least one processor, a user profile associated with the user;
      wherein the user profile comprises user persona attributes;
      wherein the user persona attributes comprise at least one of:
         a user role within an organization, or
         at least one security parameter associated with the user;
   generating, by the at least one processor, based on the user persona attributes of the user profile, at least one context query to at least one data source so as to obtain at least one context attribute representative of additional context specific to the user associated with the user-provided data record query;
   modifying, by the at least one processor, a model orchestration large language model runtime of the model orchestration large language model based at least in part on the at least one context attribute so as to customize the context of the model orchestration large language model for the user persona attributes;
   inputting, by the at least one processor, the natural language request of the data record query as a data record query prompt into the model orchestration large language model to output at least one instruction to at least one data record processing machine learning agent of a plurality of data record processing machine learning agents based at least in part on trained parameters of the model orchestration large language model and the at least one context attribute;
   inputting, by the at least one processor, the at least one instruction into the at least one data record processing machine learning agent to output at least one response;
   inputting, by the at least one processor, the at least one response as a response prompt into the model orchestration large language model to output to the user computing device at least one natural language response representative of the at least one action based at least in part on trained parameters of the model orchestration large language model and the at least one context attribute; and
   causing to display, by the at least one processor, the at least one natural language response in a graphical user interface (GUI) rendered on the user computing device.

2. The method of claim 1, wherein the plurality of data record processing machine learning agents are configured to be instantiated in parallel.

3. The method of claim 1, further comprising:
   storing, by the at least one processor, at least one record of the at least one instruction output by the model orchestration large language model;
   determining, by the at least one processor, the at least one data record processing machine learning agent associated with the at least one instruction;
   determining, by the at least one processor, the at least one response associated with the at least one data record processing machine learning agent;
   generating, by the at least one processor, at least one explainability prompt configured to elicit a natural language explanation from the model orchestration large language model; and
   inputting, by the at least one processor, the at least one explainability prompt, the at least one record of the at least one instruction, the at least one data record processing machine learning agent and the at least one response into the model orchestration large language model to output the natural language explanation based at least in part on trained parameters of the model orchestration large language model and the at least one context attribute; and
   causing to display, by the at least one processor, the natural language explanation in the GUI rendered on the user computing device.

4. The method of claim 1, wherein the at least one data record processing machine learning agent is at least two data record processing machine learning agents;
   wherein at least one first data record processing machine learning agent is adversarial to at least one second data record processing machine learning agent.

5. The method of claim 4, wherein the at least one first data record processing machine learning agent is configured to output the at least one response; and
   wherein the at least one second data record processing machine learning agent is configured to:
      ingest the at least one response from the at least one first data record processing machine learning agent;

determine a correctness assessment based at least in part on correctness assessment machine learning parameters; and refine the at least one response based at least in part on the correctness assessment.

6. The method of claim 1, further comprising:

inputting, by the at least one processor, at least one compliance rule into at least one compliance verification machine learning agent to output at least one compliance verification prompt based at least in part on a plurality of compliance verification parameters;

wherein the at least one compliance verification prompt is configured to cause the model orchestration large language model to verify compliance of the at least one natural language response with the at least one compliance rule; and inputting, by the at least one processor, the at least one compliance verification prompt into the model orchestration large language model to output at least one compliance verification of the at least one natural language model based at least in part on the trained parameters of the model orchestration large language model and the at least one context attribute.

7. The method of claim 6, further comprising:

inputting, by the at least one processor, based on the at least one compliance verification being representative of the at least one natural language response being non-compliant, the natural language response into at least one compliance machine learning agent to output a variation to the natural language response;

inputting, by the at least one processor, the at least one compliance verification prompt and the variation to the natural language response into the model orchestration large language model to output at least one new compliance verification of the variation to the at least one natural language model based at least in part on the trained parameters of the model orchestration large language model and the at least one context attribute.

8. The method of claim 6, wherein the at least one compliance verification comprises at least one of:

a pass indicative of the at least one natural language response being compliant, or a fail indicative of the at least one natural language response being non-compliant.

9. The method of claim 1, wherein the at least one instruction comprises at least one programmatic step comprising at least one of:

at least one database query, at least one application programming interface (API) call, or at least one internet search query.

10. The method of claim 9, further comprising:

tracking, by the at least one processor, the at least one instruction;

generating, by the at least one processor, at least one model explainability prompt representative of the at least one instruction;

wherein the at least one model explainability prompt is configured to cause the model orchestration large language model to output a natural language explanation of at least one of:

the at least one data record processing machine learning agent, or the at least one programmatic step; and inputting, by the at least one processor, the at least one model explainability prompt into the model orchestration large language model to output the natural language explanation based at least in part on the trained parameters of the model orchestration large language model and the at least one context attribute.

11. A system comprising:

at least one processor in communication with at least one non-transitory computer readable medium having software instructions stored thereon, wherein the at least one processor, upon execution of the software instructions, is configured to:

receive, from at least one user computing device associated with a user, a user-provided data record query comprising a natural language request to perform at least one action with at least one data record;

determine a user profile associated with the user;

wherein the user profile comprises user persona attributes;

wherein the user persona attributes comprise at least one of:

a user role within an organization, or at least one security parameter associated with the user;

generate based on the user persona attributes of the user profile, at least one context query to at least one data source so as to obtain at least one context attribute representative of additional context specific to the user associated with the user-provided data record query;

modify a model orchestration large language model runtime of the model orchestration large language model based at least in part on the at least one context attribute so as to customize the context of the model orchestration large language model for the user persona attributes;

input the natural language request of the data record query as a data record query prompt into the model orchestration large language model to output at least one instruction to at least one data record processing machine learning agent of a plurality of data record processing machine learning agents based at least in part on trained parameters of the model orchestration large language model and the at least one context attribute;

input the at least one instruction into the at least one data record processing machine learning agent to output at least one response;

input the at least one response as a response prompt into the model orchestration large language model to output to the user computing device at least one natural language response representative of the at least one action based at least in part on trained parameters of the model orchestration large language model and the at least one context attribute; and cause to display the at least one natural language response in a graphical user interface (GUI) rendered on the user computing device.

12. The system of claim 11, wherein the plurality of data record processing machine learning agents are configured to be instantiated in parallel.

13. The system of claim 11, wherein the at least one processor is further configured to:

storing, by the at least one processor, at least one record of the at least one instruction output by the model orchestration large language model;

determining, by the at least one processor, the at least one data record processing machine learning agent associated with the at least one instruction;

determining, by the at least one processor, the at least one response associated with the at least one data record processing machine learning agent;

generating, by the at least one processor, at least one explainability prompt configured to elicit a natural language explanation from the model orchestration large language model; and inputting, by the at least one processor, the at least one explainability prompt, the at least one record of the at least one instruction, the at least one data record processing machine learning agent and the at least one response into the model orchestration large language model to output the natural language explanation based at least in part on trained parameters of the model orchestration large language model and the at least one context attribute; and causing to display, by the at least one processor, the natural language explanation in the GUI rendered on the user computing device.

14. The system of claim 11, wherein the at least one data record processing machine learning agent is at least two data record processing machine learning agents;

wherein at least one first data record processing machine learning agent is adversarial to at least one second data record processing machine learning agent.

15. The system of claim 14, wherein the at least one first data record processing machine learning agent is configured to output the at least one response; and wherein the at least one second data record processing machine learning agent is configured to:
ingest the at least one response from the at least one first data record processing machine learning agent;
determine a correctness assessment based at least in part on correctness assessment machine learning parameters; and
refine the at least one response based at least in part on the correctness assessment.

16. The system of claim 11, wherein the at least one processor is further configured to:

input at least one compliance rule into at least one compliance verification machine learning agent to output at least one compliance verification prompt based at least in part on a plurality of compliance verification parameters;

wherein the at least one compliance verification prompt is configured to cause the model orchestration large language model to verify compliance of the at least one natural language response with the at least one compliance rule; and input the at least one compliance verification prompt into the model orchestration large language model to output at least one compliance verification of the at least one natural language model based at least in part on the trained parameters of the model orchestration large language model and the at least one context attribute.

17. The system of claim 16, wherein the at least one processor is further configured to:

input based on the at least one compliance verification being representative of the at least one natural language response being non-compliant, the natural language response into at least one compliance machine learning agent to output a variation to the natural language response;

input the at least one compliance verification prompt and the variation to the natural language response into the model orchestration large language model to output at least one new compliance verification of the variation to the at least one natural language model based at least in part on the trained parameters of the model orchestration large language model and the at least one context attribute.

18. The system of claim 16, wherein the at least one compliance verification comprises at least one of:
a pass indicative of the at least one natural language response being compliant, or
a fail indicative of the at least one natural language response being non-compliant.

19. The system of claim 11, wherein the at least one instruction comprises at least one programmatic step comprising at least one of:
at least one database query,
at least one application programming interface (API) call, or
at least one internet search query.

20. The system of claim 19, wherein the at least one processor is further configured to:
track the at least one instruction;
generate at least one model explainability prompt representative of the at least one instruction;
wherein the at least one model explainability prompt is configured to cause the model orchestration large language model to output a natural language explanation of at least one of:
the at least one data record processing machine learning agent, or
the at least one programmatic step; and
input the at least one model explainability prompt into the model orchestration large language model to output the natural language explanation based at least in part on the trained parameters of the model orchestration large language model and the at least one context attribute.

* * * * *